(12) United States Patent
Hirsch et al.

(10) Patent No.: US 8,048,380 B2
(45) Date of Patent: Nov. 1, 2011

(54) PROCESS AND PLANT FOR PRODUCING METAL OXIDE FROM METAL COMPOUNDS

(75) Inventors: Martin Hirsch, Friedrichsdorf (DE); Werner Stockhausen, Bad Vilbel (DE); Michael Stroeder, Neu-Anspach (DE)

(73) Assignee: Outotec Oyj, Espoo (FI)

( * ) Notice: Subject to any disclaimer, the term of this patent is extended or adjusted under 35 U.S.C. 154(b) by 161 days.

(21) Appl. No.: 12/501,022

(22) Filed: Jul. 10, 2009

(65) Prior Publication Data

US 2009/0274589 A1 Nov. 5, 2009

Related U.S. Application Data

(62) Division of application No. 10/540,071, filed as application No. PCT/EP03/14213 on Dec. 13, 2003, now Pat. No. 7,662,351.

(30) Foreign Application Priority Data

Dec. 23, 2002 (DE) .................................. 102 60 739

(51) Int. Cl.
*F27B 15/08* (2006.01)
*B01J 8/18* (2006.01)

(52) U.S. Cl. ......... 422/145; 422/139; 422/146; 422/147

(58) Field of Classification Search .................. 422/139, 422/145, 146, 147
See application file for complete search history.

(56) References Cited

U.S. PATENT DOCUMENTS

| | | | |
|---|---|---|---|
| 2,485,317 A | 10/1949 | Roetheli |
| 2,582,710 A | 1/1952 | Martin |
| 2,607,666 A | 8/1952 | Martin |
| 2,714,126 A | 7/1955 | Keith |
| 2,826,460 A | 3/1958 | Cameron et al. |
| 2,864,674 A | 12/1958 | King |
| 2,874,095 A | 2/1959 | Boisture et al. |
| 2,901,421 A | 8/1959 | Bourguet et al. |
| 3,528,179 A | 9/1970 | Smith |
| 3,565,408 A | 2/1971 | Reh et al. |
| 3,578,798 A | 5/1971 | Lapple et al. |

(Continued)

FOREIGN PATENT DOCUMENTS

AU 199894057 5/2000

(Continued)

OTHER PUBLICATIONS

English abstract of German application No. 41 03 965.

(Continued)

*Primary Examiner* — Walter Griffin
*Assistant Examiner* — Lessanework Seifu
(74) *Attorney, Agent, or Firm* — Leydig, Voit & Mayer, Ltd.

(57) ABSTRACT

A plant for producing metal oxide from metal compounds includes a fluidized-bed reactor in which the metal compounds are heated by a combustion of a fuel to produce metal oxide. The fluidized-bed-reactor reactor includes at least one gas supply tube at least partly surrounded by an annular chamber in which a stationary annular fluidized bed is disposed, and a mixing chamber disposed above an orifice region of the gas supply tube. A gas flowing through the gas supply tube entrains solids from the stationary annular fluidized bed when passing through the orifice region.

18 Claims, 5 Drawing Sheets

| U.S. PATENT DOCUMENTS | | | | FOREIGN PATENT DOCUMENTS | | |
|---|---|---|---|---|---|---|
| 3,671,424 A | 6/1972 | Saxton | | CN | 1424280 | 6/2003 |
| 3,876,392 A | 4/1975 | Kalina et al. | | CN | 1729046 A | 2/2006 |
| 3,879,530 A | 4/1975 | Perret et al. | | CN | 1732037 A | 2/2006 |
| 3,884,620 A | 5/1975 | Rammler | | CN | 1732041 A | 2/2006 |
| 3,995,987 A | 12/1976 | MacAskill | | CN | 1732276 | 2/2006 |
| 4,044,094 A | 8/1977 | Barner et al. | | CN | 1738918 | 2/2006 |
| 4,073,642 A | 2/1978 | Collin et al. | | CN | 1756851 A | 4/2006 |
| 4,080,437 A | 3/1978 | Reh et al. | | DE | 1016938 | 10/1957 |
| 4,091,085 A | 5/1978 | Reh et al. | | DE | 1087577 | 8/1960 |
| 4,147,911 A | 4/1979 | Nishitani et al. | | DE | 1948754 | 5/1971 |
| 4,191,544 A | 3/1980 | Boll et al. | | DE | 1667421 | 2/1972 |
| 4,307,277 A | 12/1981 | Maeda et al. | | DE | 1667421 A1 | 2/1972 |
| 4,338,283 A | 7/1982 | Sakamoto et al. | | DE | 2063021 | 7/1972 |
| 4,377,466 A | 3/1983 | Wallman | | DE | 2524541 A1 | 12/1976 |
| 4,402,754 A | 9/1983 | Schmidt et al. | | DE | 2636134 | 2/1977 |
| 4,404,755 A | 9/1983 | Stewart et al. | | DE | 2805906 A1 | 8/1979 |
| 4,490,287 A | 12/1984 | Hardwick et al. | | DE | 3235559 | 5/1984 |
| 4,529,579 A | 7/1985 | Raahauge | | DE | 2624302 | 4/1987 |
| 4,545,132 A | 10/1985 | Li et al. | | DE | 248109 A1 | 7/1987 |
| 4,555,388 A | 11/1985 | Hundebol | | DE | 3822999 | 1/1990 |
| 4,676,824 A | 6/1987 | Daradimos et al. | | DE | 278348 | 5/1990 |
| 4,716,856 A | 1/1988 | Beisswenger et al. | | DE | 40 15031 | 11/1991 |
| 4,786,477 A | 11/1988 | Yoon et al. | | DE | 41 03 965 | 4/1992 |
| 4,789,580 A | 12/1988 | Hirsch et al. | | DE | 4206602 | 6/1993 |
| 4,795,547 A | 1/1989 | Barnes | | DE | 4410093 | 3/1995 |
| 4,806,158 A | 2/1989 | Hirsch et al. | | DE | 196 09284 | 9/1997 |
| 4,817,563 A | 4/1989 | Beisswenger et al. | | DE | 19841513 | 5/1999 |
| 4,919,715 A | 4/1990 | Smith et al. | | DE | 198 13 286 A1 | 9/1999 |
| 4,966,757 A | 10/1990 | Lewis et al. | | DE | 694 16458 | 9/1999 |
| 4,992,245 A | 2/1991 | Van Slooten et al. | | DE | 694 17103 | 9/1999 |
| 5,033,413 A | 7/1991 | Zenz et al. | | DE | 10101157 | 7/2002 |
| 5,084,140 A | 1/1992 | Holland et al. | | DE | 10061386 | 9/2002 |
| 5,205,350 A | 4/1993 | Hirsch et al. | | DE | 10164086 | 8/2003 |
| 5,316,735 A * | 5/1994 | Ivanov et al. ............ 422/143 | | DE | 10260743 | 7/2004 |
| 5,349,154 A | 9/1994 | Harker et al. | | EP | 246191 | 11/1987 |
| 5,374,413 A | 12/1994 | Kim et al. | | EP | 0246191 | 11/1987 |
| 5,382,412 A | 1/1995 | Kim et al. | | EP | 534243 | 3/1993 |
| 5,382,418 A | 1/1995 | Thone et al. | | EP | 0575245 A1 | 12/1993 |
| 5,387,321 A | 2/1995 | Holland et al. | | EP | 0630 683 | 12/1994 |
| 5,437,850 A | 8/1995 | Kroehl et al. | | EP | 630975 | 12/1994 |
| 5,505,907 A | 4/1996 | Hiltunen et al. | | EP | 748391 | 12/1996 |
| 5,527,379 A | 6/1996 | Hirsch et al. | | EP | 0762990 | 3/1997 |
| 5,560,762 A | 10/1996 | Bresser et al. | | EP | 995065 | 4/2000 |
| 5,573,689 A | 11/1996 | Fukuoka et al. | | GB | 827627 | 2/1960 |
| 5,603,748 A | 2/1997 | Hirsch et al. | | GB | 915412 | 1/1963 |
| 5,783,158 A | 7/1998 | Tacke et al. | | GB | 951245 | 3/1964 |
| 5,807,530 A | 9/1998 | Anderson et al. | | GB | 1316849 | 5/1973 |
| 5,942,110 A | 8/1999 | Norris | | GB | 1368210 | 9/1974 |
| 6,007,869 A | 12/1999 | Schreieder et al. | | GB | 1502576 | 3/1978 |
| 6,015,539 A | 1/2000 | Schmidt et al. | | RU | 2125016 C1 | 1/1999 |
| 6,022,513 A | 2/2000 | Pecoraro et al. | | SU | 932979 A3 | 5/1982 |
| 6,074,533 A | 6/2000 | Tranquilla et al. | | WO | WO-8909290 | 10/1989 |
| 6,110,413 A | 8/2000 | Jung et al. | | WO | WO-9011824 | 10/1990 |
| 6,197,234 B1 | 3/2001 | Goudmand et al. | | WO | WO-9808989 | 3/1998 |
| 6,368,389 B1 | 4/2002 | Birke et al. | | WO | WO 0144719 A1 | 6/2001 |
| 6,395,248 B1 | 5/2002 | Kim et al. | | WO | WO-02055444 | 7/2002 |
| 6,413,477 B1 | 7/2002 | Govoni et al. | | WO | WO2004/056941 * | 7/2004 |
| 6,416,721 B1 | 7/2002 | Sanjurjo et al. | | WO | WO-2004056467 | 7/2004 |
| 6,827,786 B2 | 12/2004 | Lord | | | | |
| 6,830,597 B1 | 12/2004 | Green | | | | |
| 7,625,422 B2 | 12/2009 | Orth et al. | | | | |
| 7,854,608 B2 * | 12/2010 | Nuber et al. ............ 432/16 | | | | |
| 2002/0113024 A1 | 8/2002 | Pilz et al. | | | | |
| 2004/0042952 A1 | 3/2004 | Bergeron et al. | | | | |
| 2006/0162500 A1 | 7/2006 | Nuber et al. | | | | |
| 2006/0167047 A1 | 7/2006 | Timmers et al. | | | | |
| 2006/0228281 A1 | 10/2006 | Stroeder et al. | | | | |
| 2006/0230879 A1 | 10/2006 | Stroder | | | | |
| 2006/0230880 A1 | 10/2006 | Hirsch et al. | | | | |
| 2006/0231433 A1 | 10/2006 | Rufo et al. | | | | |
| 2006/0231466 A1 | 10/2006 | Nuber | | | | |
| 2006/0237300 A1 | 10/2006 | Stroder et al. | | | | |
| 2006/0249100 A1 | 11/2006 | Freytag et al. | | | | |
| 2006/0263292 A1 | 11/2006 | Hirsch et al. | | | | |
| 2006/0278566 A1 | 12/2006 | Orth et al. | | | | |
| 2007/0137435 A1 | 6/2007 | Orth et al. | | | | |
| 2008/0124253 A1 | 5/2008 | Schmidt et al. | | | | |
| 2010/0040512 A1 | 2/2010 | Orth et al. | | | | |

OTHER PUBLICATIONS

English abstract of German application No. 2624302.
English abstract of German application No. 3822999.
English abstract of German application No. 40 15031.
English abstract of German application No. 69417103.
English abstract of German application No. 694 16458.
English abstract of German application No. 196 09284.
English abstract of German application No. 19813286.
"Ullmann's Encyclopedia of Industrial Chemistry" 5th edition, 1994, vol. A25, pp. 574-575.
Sander U H F et al. "Production from elemental sulphur" Sulphur, Sulphur Dioxide and Sulphuric Acid. Introduction to their Industrial Chemistry and Technology, London, British Sulphur Corporation, GB, 1984, pp. 168-176, XP0006085.
Barbara Elvers et al. "Ullmann's Encyclopedia of Industrial Chemistry", Fifth, Completely Revised Edition, vol. A25, VCH, pp. 567-577.

International Search Report for International No. PCT/EP2007/001128 mailed on Aug. 31, 2007.
Notice of Allowance dated Feb. 6, 2009 for U.S. Appl. No. 10/540,355, filed Feb. 2, 2006.
Vijay, "Preoxidation and Hydrogen Reduction of Ilmenite in a Fluidized Bed Reactor" XP 000632260, Metallurgical and Material Transactions B, vol. 27B, Oct. 1996, 9. 731-738.
Kim, Y.T. et al, "Entrainment of solids in an internally circulating fluidized bed with draft tube". Chemical Engineering Journal, vol. 66, (1997), p. 105-110.
Notice of Allowance dated Jul. 20, 2009 for U.S. Appl. No. 10/540,435, filed Mar. 27, 2006.
Office Action dated Sep. 19, 2008 for U.S. Appl. No. 10/540,435, filed Mar. 27, 2006.
Office Action dated Feb. 11, 2009 for U.S. Appl. No. 10/540,497, filed May 31, 2006.
Office Action dated Aug. 12, 2008 for U.S. Appl. No. 10/540,355, filed Feb. 2, 2006.
Office Action dated Mar. 27, 2008 for U.S. Appl. No. 10/540,355, filed Feb. 2, 2006.
Office Action dated Jul. 8, 2009 for U.S. Appl. No. 10/540,073, filed Jul. 19, 2006.
Office Action dated Jan. 26, 2009 for U.S. Appl. No. 10/540,073, filed Jul. 19, 2006.
Office Action dated Aug. 21, 2008 for U.S. Appl. No. 10/540,073, filed Jul. 19, 2006.
Office Action dated May 13, 2009 for U.S. Appl. No. 10/540,376, filed Jan. 17, 2006.
Office Action dated Oct. 9, 2008 for U.S. Appl. No. 10/540,376, filed Jan. 17, 2006.
Office Action dated Jun. 2, 2008 for U.S. Appl. No. 10/540,376, filed Jan. 17, 2006.
Office Action dated Sep. 17, 2008 for U.S. Appl. No. 10/540,434, filed May 16, 2006.
Notice of Allowance dated Dec. 3, 2008 for U.S. Appl. No. 10/540,437, filed May 10, 2006.
Office Action dated Jun. 16, 2008 for U.S. Appl. No. 10/540,437, filed May 10, 2006.
Office Action dated Apr. 17, 2009 for U.S. Appl. No. 10/540,438, filed Jun. 6, 2006.
Notice of Allowability for U.S. Appl. No. 10/540,438, filed Jun. 6, 2006.
Office Action dated Jul. 10, 2007 for U.S. Appl. No. 10/540,438, filed Jun. 6, 2006.
Office Action dated Jul. 14, 2008 for U.S. Appl. No. 10/540,436, filed Nov. 10, 2005.
Office Action dated Oct. 30, 2008 for U.S. Appl. No. 10/540,436, filed Nov. 10, 2005.
Office Action dated Apr. 17, 2009 for U.S. Appl. No. 10/540,436, filed Nov. 10, 2005.
Office Action dated Dec. 27, 2007 for U.S. Appl. No. 10/540,436, filed Nov. 10, 2005.

* cited by examiner

PROCESS AND PLANT FOR PRODUCING METAL OXIDE FROM METAL COMPOUNDS

CROSS REFERENCE TO PRIOR APPLICATIONS

This application is a divisional of U.S. application Ser. No. 10/540,071, filed on May 11, 2006. U.S. application Ser. No. 10/540,071 is a U.S National Phase application under 35 U.S.C. §371 of International Application No. PCT/EP2003/014213, filed on Dec. 13, 2003, which claims benefit to German Patent Application No, 102 60 739.7, filed on Dec. 23, 2002. The International Application was published in English on Jul. 8, 2004 as WO 2004/056701 A1 under PCT Article 21(2).

TECHNICAL FIELD

The present invention relates to a process for producing metal oxide from metal compounds, in particular metal hydroxide or metal carbonate, in which the metal compound is conveyed into a fluidized bed reactor, heated there to a temperature of 650 to 1150° C. by combustion of fuel, and metal oxide is generated, as well as to a corresponding plant.

From EP 0 861 208 B1 there is known a process for producing anhydrous alumina from aluminum hydroxide in a circulating fluidized bed, in which the alumina is first dried in several preheating stages, partly calcined, and in the preheated condition introduced into a fluidized-bed reactor in which the temperatures lie in the range from 800 to 1000° C. due to the combustion of fuel, and alumina is generated. The exhaust gas of the fluidized-bed reactor, which is obtained during the combustion, is supplied to the preheating stages and utilized energetically. The metal oxide withdrawn from the reactor is subjected to multi-stage cooling in direct contact with air and at least passed through a direct cooling stage, in which the metal oxide is pneumatically transported upwards into a separating cyclone via a delivery conduit. Furthermore, the partly cooled metal oxide is passed through at least one fluidized cooler with indirect cooling.

In the plants known so far, reactors with a stationary or a circulating fluidized bed are used for calcining or heating the solids. However, the energy utilization of the calcining step, which is achieved when using a stationary fluidized bed, needs improvement. On the one hand, this is due to the fact that the mass and heat transfer is rather moderate due to the comparatively low degree of fluidization, and therefore an internal combustion is difficult to control. In addition, preheating of combustion air can hardly be integrated in a suspension heat exchanger. Normally, combustion air is preheated in a suspension heat exchanger by cooling previously calcined or heated solids and using the dust-laden cooling air as combustion air. However, dust-laden gases are rather not admitted to the fluidizing nozzles of the stationary fluidized bed. Due to the higher degree of fluidization, circulating fluidized beds on the other hand have better conditions for a mass and heat transfer and allow the integration of a suspension heat exchanger, but are restricted in terms of their solids retention time due to the higher degree of fluidization. Therefore, a multi-stage calcination is provided in EP 0 861 298 B1. Frequently, difficulties arise in calcining plants due to the pre- or postcombustion of natural gas or other fuels supplied.

DESCRIPTION OF THE INVENTION

Therefore, it is the object of the present invention to improve the conditions for a heat and mass exchange during the calcination of metal compounds such as metal hydroxide or metal carbonate and thereby rather optimally utilize the thermal energies used.

In accordance with the invention, this object is solved by a process as mentioned above, in which a first gas or gas mixture is introduced from below through a preferably centrally arranged gas supply tube (central tube) into a mixing chamber of the reactor, the central tube being at least partly surrounded by a stationary annular fluidized bed which is fluidized by supplying fluidizing gas, and in which the gas velocities of the first gas or gas mixture as well as of the fluidizing gas for the annular fluidized bed are adjusted such that the Particle-Froude numbers in the central tube lie between 1 and 100, in the annular fluidized bed between 0.02 and 2, and in the mixing chamber between 0.3 and 30.

With the process in accordance with the invention, the advantages of a stationary fluidized bed, such as a sufficiently long solids retention time, and the advantages of a circulating fluidized bed, such as a good mass and heat transfer, can surprisingly be combined with each other during the heat treatment, while the disadvantages of both systems are avoided. When passing through the upper region of the central tube, the first gas or gas mixture entrains solids from the annular stationary fluidized bed, which is referred to as annular fluidized bed, into the mixing chamber, so that due to the high speed differences between the solids and the first gas an intensively mixed suspension is formed and an optimum mass and heat transfer between the two phases is achieved.

By correspondingly adjusting the filling level in the annular fluidized bed as well as the gas velocities of the first gas or gas mixture and the fluidizing gas, the solids load of the suspension above the orifice region of the central tube can be varied within wide ranges, so that the pressure loss of the first gas between the orifice region of the central tube and the upper outlet of the mixing chamber can lie between 1 mbar and 100 mbar. In the case of high solids loads of the suspension in the mixing chamber, a large part of the solids will rain out of the suspension and fall back into the annular fluidized bed. This recirculation is called internal solids recirculation, the stream of solids circulating in this internal circulation normally being significantly larger than the amount of solids supplied to the reactor from outside. The (smaller) amount of not precipitated solids is discharged from the mixing chamber together with the first gas or gas mixture. The retention time of the solids in the reactor can be varied within wide limits by the choice of height and cross-sectional area of the annular fluidized bed and be adapted to the desired heat treatment. Due to the high solids load on the one hand and the good mass and heat transfer on the other hand, excellent conditions for a virtually complete combustion of the fuel introduced into the reactor are obtained above the orifice region of the central tube. There can, for instance, be performed a virtually complete combustion of natural gas in the vicinity of the ignition temperature and/or with little excess of oxygen without local temperature peaks being obtained. The amount of solids discharged from the reactor with the gas stream is completely or at least partly recirculated to the reactor, the recirculation expediently being effected into the stationary fluidized bed. The solids mass flow thus recirculated to the annular fluidized bed normally lies in the same order of magnitude as the solids mass flow supplied to the reactor from outside. Apart from the excellent utilization of energy, another advantage of the process in accordance with the invention consists in the possibility of quickly, easily and reliably adapting the energy transfer of the process and the mass transfer to the requirements by changing the flow velocities of the first gas or gas mixture and of the fluidizing gas.

To ensure a particularly effective heat transfer in the mixing chamber and a sufficient retention time in the reactor, the gas velocities of the first gas mixture and of the fluidizing gas for the fluidized bed are preferably adjusted such that the dimensionless Particle-Froude numbers ($Fr_p$) are 1.15 to 20 in the central tube, 0.115 to 1.15 in the annular fluidized bed and/or 0.37 to 3.7 in the mixing chamber. The Particle-Froude numbers are each defined by the following equation:

$$Fr_p = \frac{u}{\sqrt{\frac{(\rho_s - \rho_f)}{\rho_f} * d_p * g}}$$

with

| | |
|---|---|
| u = | effective velocity of the gas flow in m/s |
| $p_s$ = | density of the solid particle in kg/m³ |
| $p_f$ = | effective density of the fluidizing gas in kg/m³ |
| $d_p$ = | mean diameter in m of the particles of the reactor inventory (or the particles formed) during operation of the reactor |
| g = | gravitational constant in m/s². |

When using this equation it should be considered that $d_p$ does not indicate the mean diameter ($d_{50}$) of the material used, but the mean diameter of the reactor inventory formed during the operation of the reactor, which can differ significantly in both directions from the mean diameter of the material used (primary particles). Even from very fine-grained material with a mean diameter of e.g. 3 to 10 μm, particles (secondary particles) with a mean diameter of 20 to 30 μm can for instance be formed during the heat treatment. On the other hand, some materials, e.g. ores, are decomposed during the heat treatment.

In accordance with a development of the inventive idea it is proposed to adjust the filling level of solids in the reactor such that the annular fluidized bed for instance at least partly extends beyond the upper orifice end of the central tube by a few centimeters, and thus solids are constantly introduced into the first gas or gas mixture and entrained by the gas stream to the mixing chamber located above the orifice region of the central tube. In this way, a particularly high solids load of the suspension is achieved above the orifice region of the central tube, which allows e.g. a complete combustion under difficult conditions.

By means of the process in accordance with the invention all kinds of metal hydroxide or metal carbonate can be exposed to an effective heat treatment, in order to produce in particular metal oxides. The process is particularly useful for producing alumina by calcining aluminum hydroxide. The aluminum hydroxide used has a fine grain size (about 100 μm), the grain size at least of the major part of the solids containing metal hydroxide or metal carbonate generally being smaller than 5 mm. The process can also be used for calcining dolomite or calcium carbonate.

In a preferred embodiment of the present invention, preheated gas containing oxygen is supplied to the reactor through the central tube, which represents the entire or at least a very high fraction of the entire combustion air. This ensures a sufficient supply of oxygen into the mixing chamber of the reactor, in which an internal combustion supplies the thermal energy necessary for the reaction in the reactor.

The generation of the amount of heat necessary for the operation of the reactor can be effected in any way known to the skilled person for this purpose. In accordance with the invention it is provided to introduce gaseous and/or liquid fuel into the reactor through the central tube, which fuel is burnt above the central tube in the mixing chamber of the reactor. In particular when supplying gaseous fuel, e.g. natural gas, a premixing of the gaseous fuel with the oxygen-containing gas occurs due to the strong turbulences in the central tube, ignition and combustion then being effected in the mixing chamber. Such internal combustion leads to a particularly effective heat transfer between the hot particles of the stationary annular fluidized bed, which were entrained by the gas stream, and the process gases. To avoid a premature ignition of the fuel still in the central tube, the gaseous or liquid fuel is supplied in the vicinity of the outlet opening (upper orifice region) of the central tube. To this end, for instance a lance arranged in the central tube can be used for supplying fuel. The reactor temperature can easily be controlled by varying the flow of gaseous and/or liquid fuel.

Alternatively or in addition, solid, liquid or gaseous fuel, for instance coal or liquid hydrocarbons, can directly be introduced into the reactor via a corresponding feed conduit. In this case, it is recommended to control the temperature in the reactor for instance by varying the amount of air supplied. In accordance with a particularly preferred variant of the present invention gaseous fuel and/or air is introduced into the lower region of the annular fluidized bed of the reactor as gas for fluidizing the annular fluidized bed. Instead of air, all other gases or gas mixtures known to the skilled person for this purpose can of course also be used for fluidization. Interestingly, it was found out that as fluidizing gas there can also exclusively be used gaseous fuel, which passes through the annular fluidized bed and meets with the preheated combustion air in the mixing chamber, where ideal conditions exist for an optimum combustion.

It turned out to be advantageous to operate the reactor at a pressure of 0.8 to 10 bar and particularly preferably at atmospheric pressure.

Upstream of the reactor, one or more preheating stages may be provided, in which the solids containing metal hydroxide or metal carbonate are suspended, dried, preheated and/or partly calcined before the heat treatment in the reactor, at least part of their moisture content being removed. Preferably, two preheating stages, each comprising a heat exchanger and a downstream separator, are provided upstream of the reactor, the material in the first heat exchanger being heated by exhaust gas from the second heat exchanger, and the material in the second heat exchanger being heated by exhaust gas from the reactor. Both heat exchangers preferably are suspension heat exchangers. In this way, the total energy demand of the process is reduced even more.

As heat exchanger, an annular-fluidized-bed heat exchanger with a stationary fluidized bed and a mixing chamber can be used in accordance with the invention, which has a particularly good utilization of heat and energy. In addition, a strong mechanical load of the solids to be preheated is thereby avoided, which in the case of the Venturi driers conventionally used for preheating occurs in the Venturi fluidized beds of the Venturi nozzle due to strong turbulences in the conical expansion and can lead to granular disintegration and the formation of undesired fine grain. When annular-fluidized-bed heat exchangers are used as driers or preheaters in accordance with the invention, the supply of heat is effected by exhaust gas from the reactor, which is supplied for instance via a central tuyere (central tube). This principle is identical with the reactor with annular fluidized bed and mixing chamber in accordance with the invention. The solids are laterally introduced into the annular fluidized bed, dried and preheated, before the solids reach the central tuyere. In the annular fluidized bed, the solids with a Particle-Froude number $Fr_p$ of about 0.8 are fluidized with air, whereby the mechanical load is substantially lower because of the velocities reduced by a factor of about 10 to 20 as compared to the Venturi throat of the Venturi fluidized bed. In Venturi nozzles, on the other hand, Particle-Froude numbers $Fr_p$ of 15 to 20 must be adjusted, to prevent the solids from falling through the Venturi throat. In the central tuyere, Particle-Froude numbers $Fr_p$ of about 5 to 10 can be adjusted in accordance with the invention, whereas the Particle-Froude number $Fr_p$ in the mixing chamber is about 3.

For cooling the annular-fluidized-bed reactor and/or annular-fluidized-bed heat exchanger in accordance with the invention, water can be sprayed directly into or onto the annular fluidized bed. This is much easier than in reactors or driers with a Venturi fluidized bed, in which the water must generally be atomized by means of two-fluid nozzles, in order to produce small water droplets which can evaporate inside the container. Moreover, the conventional method requires an aid such as steam for atomizing the water.

After the heat treatment, a fraction between 0 and 100% of the product entrained by the exhaust gas of the reactor is discharged via a separator into a preferably fluidizing-gas-operated mixing vessel, where it is mixed with partly calcined solids, particularly metal hydroxide, in particular for adjusting the quality of the product and for cooling the hot metal oxide. Preferably, at least part of the product is recirculated to the annular fluidized bed of the reactor via a solids return conduit. An essential advantage of this solids recirculation consists in the fact that the solids load of the suspension in the vicinity of the mixing chamber can specifically be adjusted to the requirements of the process, and even be changed during the operation as required.

In accordance with a development of this inventive idea, the pressure loss between the central tube and the outlet conduit of the reactor is measured for this purpose and controlled by varying the amount of solids recirculated. What turned out to be particularly advantageous for this purpose is a fluidized intermediate container with downstream metering member, for instance a speed-variable rotary vane feeder or a roller-type rotary valve. The solids recirculation in a simple way contributes to keeping constant the process conditions in the reactor and/or extending the mean retention time of the solids in the reactor.

In accordance with the process of the invention, the product or product mixture is supplied after the heat treatment in the reactor from the mixing vessel and/or directly from the separator to a cooling system, which in particular forms an arrangement of a plurality of cooling stages connected in series. Such a cooling stage can be formed of direct and/or indirect heat exchangers, for instance cooling cyclones or fluidized-bed coolers.

For an improved energy utilization it is provided that the gas used for cooling in a cooling stage and heated thereby is supplied to an upstream cooling stage, the reactor and/or a preheating stage. It is conceivable to pass the gas in a cascade-like manner, beginning with the last cooling stage in which the product to be cooled has already been precooled by preceding cooling stages, through several or all preceding cooling stages. Since the product is even warmer in each of the preceding cooling stages, it is cooled further in each of the cooling stages and the gas used for cooling is heated further. Finally, the heated gas can then be supplied to the reactor preferably through the central tube and/or to a preheating stage. A particularly good recovery of heat can be achieved during the cooling of the metal oxide when cross-flow heat exchangers frequently used as indirect heat exchangers in fluidized-bed coolers are replaced by direct heat flow exchangers, so that a preferably multi-stage direct contact occurs between metal oxide to be cooled and combustion air to be preheated.

A plant in accordance with the invention, which is suited in particular for performing the above-described process, has a reactor constituting a fluidized-bed reactor for producing metal oxide from metal compounds such as metal hydroxide or metal carbonate, in which the metal compound is heated by combustion of fuel, and metal oxide is generated. In the reactor, a gas supply system is provided, which is formed such that gas flowing through the gas supply system entrains solids from a stationary annular fluidized bed, which at least partly surrounds the gas supply system, into the mixing chamber. Preferably, this gas supply system extends into the mixing chamber. It is, however, also possible to let the gas supply system end below the surface of the annular fluidized bed. The gas is then introduced into the annular fluidized bed for instance via lateral openings, entraining solids from the annular fluidized bed into the mixing chamber due to its flow velocity.

In accordance with the invention, the gas supply system has a gas supply tube (central tube) extending upwards substantially vertically from the lower region of the reactor preferably into the mixing chamber of the reactor, which gas supply tube is at least partly surrounded by a chamber in which the stationary annular fluidized bed is formed. The central tube can constitute a nozzle at its outlet opening and have one or more apertures distributed around its shell surface, so that during the operation of the reactor solids constantly get into the central tube through the apertures and are entrained by the first gas or gas mixture through the central tube into the mixing chamber. Of course, two or more central tubes with different or identical dimensions or cross-sectional shapes may also be provided in the reactor. Preferably, however, at least one of the central tubes is arranged approximately centrally with reference to the cross-sectional area of the reactor.

In accordance with a preferred embodiment, a separator, in particular a cyclone for separating solids is provided downstream of the reactor, the separator having a solids conduit which leads to the annular fluidized bed of the reactor and/or a solids conduit which leads to a mixing vessel.

To provide for a reliable fluidization of the solids and the formation of a stationary fluidized bed, a gas distributor is provided in the annular chamber of the reactor, which divides the chamber into an upper annular fluidized bed and a lower gas distributor chamber, the gas distributor chamber being connected with a supply conduit for fluidizing gas and/or gaseous fuel. Instead of the gas distributor chamber, there can also be provided a gas distributor composed of tubes and/or nozzles, wherein part of the nozzles can be connected to a gas supply for fluidizing gas and another part of the nozzles can be connected to a separate gas supply of gaseous fuel.

In accordance with the invention, the reactor can furthermore have a supply conduit for gaseous and/or liquid fuel, which leads to the central tube, as well as a supply conduit for gaseous, liquid and/or solid fuel, which leads into the annular chamber or the mixing chamber. In particular, it turned out to be particularly advantageous for a controlled supply of fuel when a lance for supplying gaseous and/or liquid fuel is arranged in the gas supply system, in particular the central tube, which lance extends up to the region of the outlet opening of the gas supply system, in particular into the upper orifice region of the central tube.

To achieve a particularly effective and gentle preheating of the educt, it is proposed in accordance with the invention to provide an annular-fluidized-bed preheating stage with a chamber for a stationary annular fluidized bed and a mixing chamber as preheating stage.

Furthermore, a preferably fluidizing-gas-operated mixing vessel for mixing the product with partly calcined solids, which are supplied via a solids supply conduit from a preheating stage, is provided downstream of the reactor.

In accordance with the invention, this is followed by a cooling system comprising direct and/or indirect cooling stages, in particular cooling cyclones and/or fluidized coolers. In the direct cooling stages, the cooling medium directly gets in contact with the product to be cooled. Desired reactions, for instance product refinements, can also be performed during the cooling process. In addition, direct cooling stages have a particularly good cooling effect. In indirect cooling stages, cooling is effected by means of a cooling medium flowing through a cooling coil. To be able to utilize the gas heated during cooling also in the process itself, the cooling stage has at least one supply conduit for gas (combustion air) heated in the cooling stage, which leads into a preheating stage, into the mixing chamber, into the gas distributor chamber and/or into the combustion chamber.

In the annular fluidized bed and/or the mixing chamber of the reactor, means for deflecting the solid and/or fluid flows may be provided in accordance with the invention. It is, for instance, possible to position an annular weir, whose diameter lies between that of the central tube and that of the reactor wall, in the annular fluidized bed such that the upper edge of the weir protrudes above the solids level obtained during operation, whereas the lower edge of the weir is disposed at a distance from the gas distributor or the like. Thus, solids raining out of the mixing chamber in the vicinity of the reactor wall must first pass the weir at the lower edge thereof, before they can be entrained by the gas flow of the central tube back into the mixing chamber. In this way, an exchange of solids is enforced in the annular fluidized bed, so that a more uniform retention time of the solids in the annular fluidized bed is obtained.

Developments, advantages and possibilities for applying the present invention can also be taken from the following description of embodiments and from the drawings. All described and/or illustrated features per se or in any combination form the subject-matter of the invention, independent of their inclusion in the claims or their back-reference.

DETAILED DESCRIPTION OF THE PREFERRED EMBODIMENTS

Figure 1:
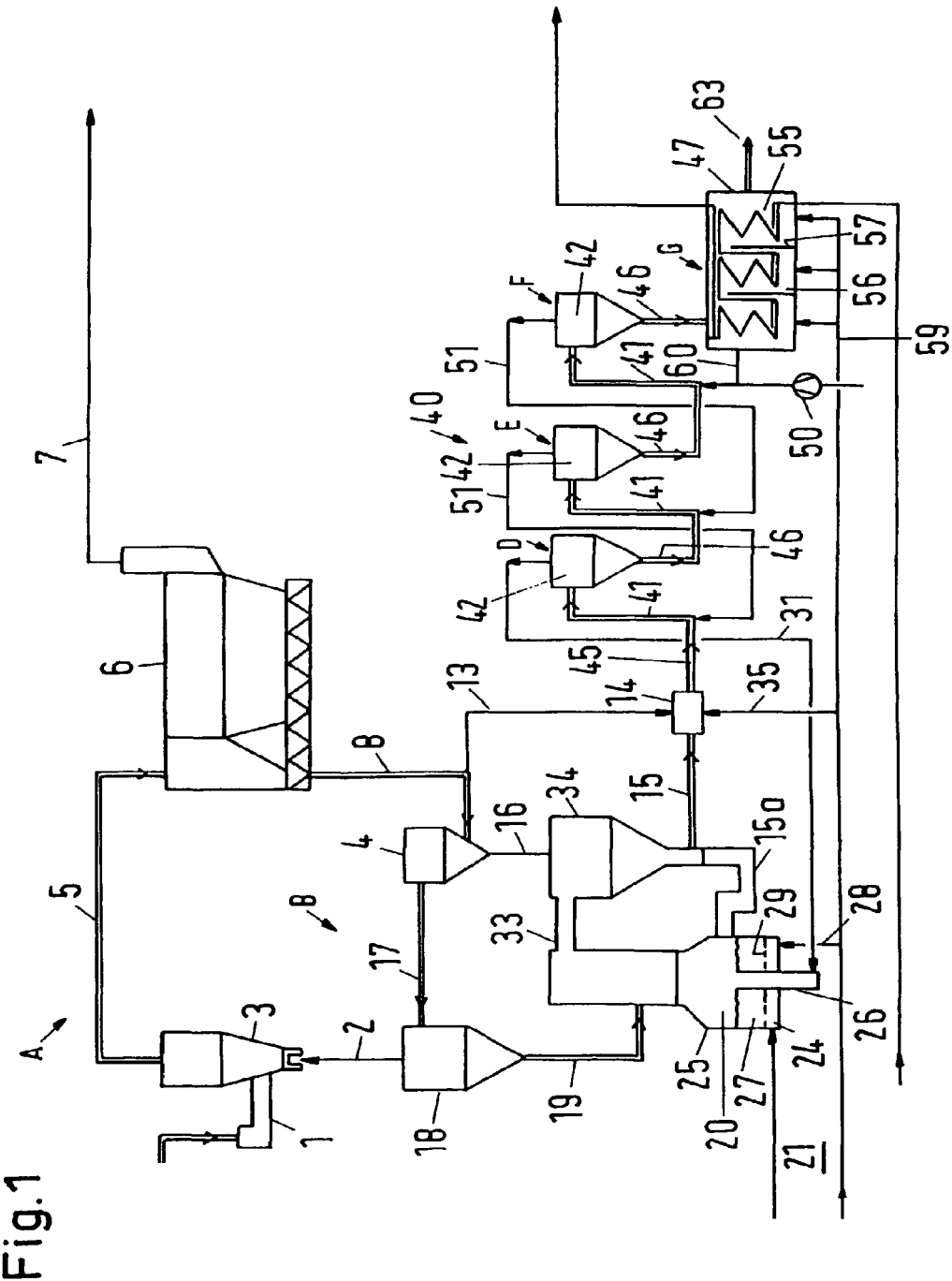
FIG. 1 shows a process diagram of a process and a plant in accordance with a first embodiment of the present invention.

For calcining metal hydroxide or metal carbonate, the plant shown in FIG. 1 has a for instance cylindrical reactor 25 with a central tube 26 arranged approximately coaxially with the longitudinal axis of the reactor 25, which central tube extends substantially vertically upwards from the bottom of the reactor 25. In the vicinity of the bottom of the reactor 25, an annular gas distributor 29 is provided, in which open supply conduits 21 and 28. In the vertically upper region of the reactor 25, which forms a mixing chamber 20, an outlet conduit 33 is arranged, which opens into a separator 34 constituting a cyclone.

When the solids are now charged into the reactor 25 via the solids conduit 19, a layer is formed on the gas distributor 29, which annularly surrounds the central tube 26 and is referred to as annular fluidized bed 27. Fluidizing gas introduced through the supply conduit 21, 28 flows through the gas distributor 29 and fluidizes the annular fluidized bed 27, so that a stationary fluidized bed is formed. The velocity of the gases supplied to the reactor 25 is adjusted such that the Particle-Froude number in the annular fluidized bed 27 lies between 0.15 and 0.35. Since only a relatively small amount of fluidizing air is required, it is not absolutely necessary to preheat the air used as fluidizing gas.

By supplying more solids into the annular fluidized bed 27, the solids level in the reactor 25 is raised to such an extent that solids get into the orifice of the central tube 26. Through the central tube 26, an oxygen-containing gas or gas mixture is at the same time introduced into the reactor 25 as combustion air, which supplies the oxygen content necessary for the combustion of gaseous, liquid or solid fuels in the mixing chamber 20. The velocity of the gas supplied to the reactor 25 through the central tube 26 preferably is adjusted such that the Particle-Froude number in the central tube 26 approximately lies between 7 and 11 and in the mixing chamber 20 approximately between 1.5 and 3.

Since the solids level of the annular fluidized bed 27 is raised above the upper edge of the central tube 26, solids flow over this edge into the central tube 26. The upper edge of the central tube 26 can be straight or be shaped differently, for instance be serrated, or have lateral openings in the shell surface. Due to the high gas velocities, the gas flowing through the central tube 26 entrains solids from the stationary annular fluidized bed 27 into the mixing chamber 20 when passing through the orifice of the central tube, whereby an intensively intermixed suspension is formed. Due to the intensive mass and heat transfer between the gas stream and the solids in the mixing chamber 20, the initially colder solids are heated particularly well due to the internal combustion in the mixing chamber 20.

As a result of the reduction of the flow velocity due to the expansion of the gas jet in the mixing chamber 20 and/or by impingement on one of the reactor walls, the entrained solids quickly lose velocity and partly fall back again into the annular fluidized bed 27. Between the reactor regions of the stationary annular fluidized bed 27 and the mixing chamber 20 a solids circulation is obtained. Due to this solids circulation the solids to be treated circulate in the reactor 25 for a particularly long time, where at the same time the very good heat transfer in the mixing chamber 20 can be utilized. This ensures a largely complete calcination of the metal salts.

Before the solids get into the reactor 25 for heat treatment (calcination), the educt metal hydroxide or metal carbonate is introduced via a screw conveyor 1 into a Venturi preheater 3 serving as heat exchanger, which belongs to a first preheating stage A. In the Venturi preheater 3, the fine-grained solids with a grain size which is substantially less than 5 mm gets in direct contact with hot gas, so that the solids are dried and preheated. For this purpose, a hot gas mixture (exhaust gas) with temperatures in the range from 200 to 500° C. is supplied to the Venturi preheater 3 of the first preheating stage A through an exhaust gas conduit 2, which gas mixture transports the fine-grained solids via a solids conduit 5 into a filter means constituting a separator 6, for instance a bag filter or an electrostatic precipitator. There, the exhaust gas is separated from the solids, and the exhaust gas escapes in the exhaust gas conduit 7 for instance via a chimney.

Via the solids conduit 8, the partly calcined solids reach the Venturi preheater 4 of a second preheating stage B. In this Venturi preheater 4, the already partly calcined solids get in direct contact with hot exhaust gas having temperatures of 650 to 1150° C., which is introduced into the Venturi preheater 4 via an exhaust gas conduit 16. From this Venturi preheater 4, the partly calcined solids together with the hot exhaust gas are conveyed through the solids conduit 17 into a separating cyclone 18 serving as separator, whose exhaust gas is introduced through the exhaust gas conduit 2 into the Venturi preheater 3 of the first heating stage A.

Via a solids conduit 19, the solids separated in the cyclone 18 get into the annular fluidized bed 27 of the fluidized-bed reactor 25, in which there exist temperatures of 650 to 1150° C., mostly about 800 to 1000° C. In addition, gaseous fuel is supplied through the fuel conduit 21 into a gas distributor chamber 24 formed below the gas distributor 29 and is introduced into the lower region of the fluidized bed 27 through the gas distributor 29. In the gas distributor chamber 24, the gaseous fuel can be mixed with the fluidizing air supplied via the supply conduit 28 and be introduced into the stationary annular fluidized bed 27 for instance through nozzles or openings of the gas distributor 29. Alternatively, nozzles connected to the fuel conduit 21 can be provided in the gas distributor 29, through which nozzles the fuel is directly introduced into the stationary annular fluidized bed.

Figure 2:
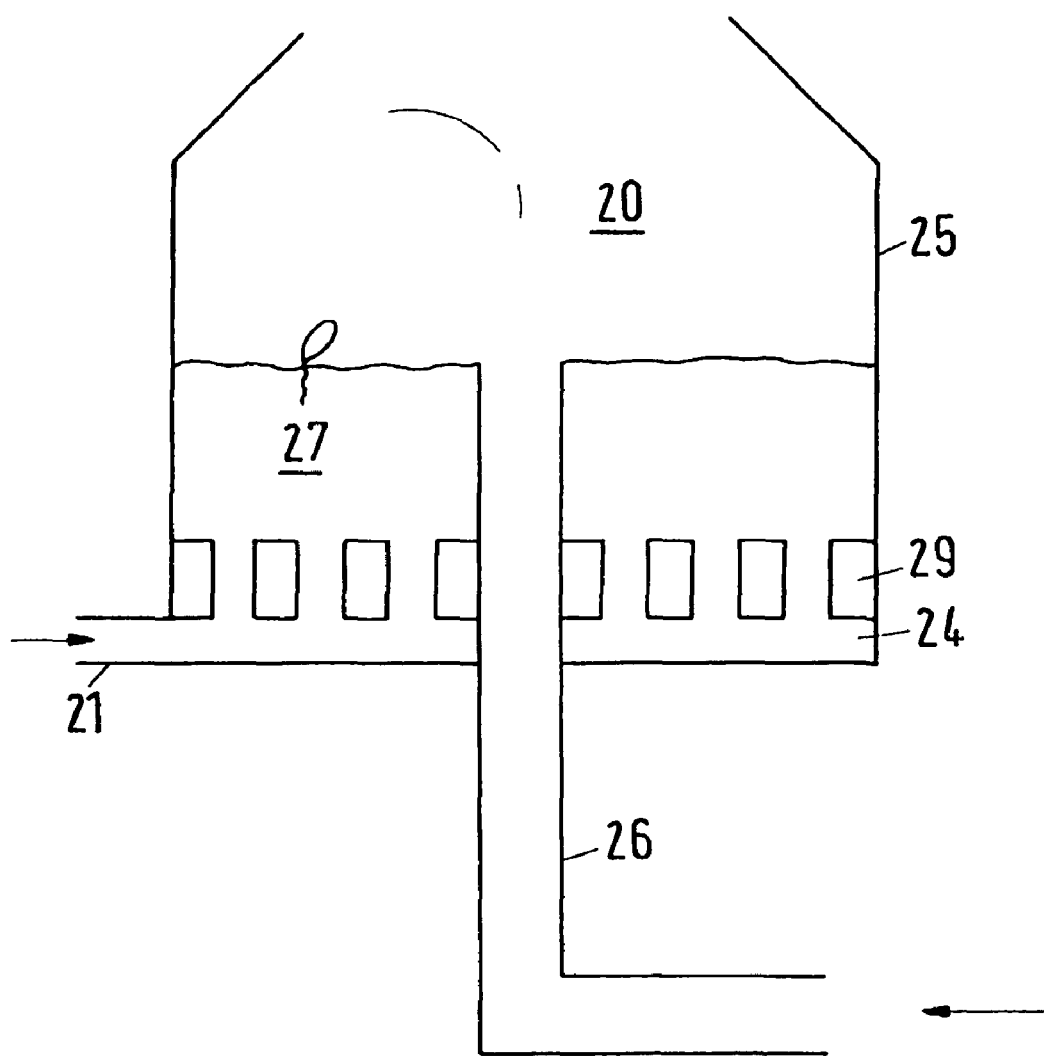
FIG. 2 shows a fluidized-bed reactor in accordance with the first embodiment.

FIG. 2 shows a variant of the fuel supply into the stationary annular fluidized bed 27 of the reactor 25, in which gaseous fuel is introduced via the fuel conduit 21 into the gas distributor chamber 24 divided by the gas distributor 29. In this variant, the gaseous fuel can be used for fluidizing the stationary annular fluidized bed 27 and completely replace the fluidizing air supplied via the supply conduit 28. Via the fuel conduit 21, there can also be supplied a mixture of gaseous fuel and fluidizing air, so that the gaseous fuel only partly replaces the fluidizing air. The gaseous fuel flows through the stationary annular fluidized bed 27 into the mixing chamber 20, in which occurs the combustion for generating the heat required for the reaction.

The hot exhaust gas of the reactor 25, which includes metal oxide product, flows through an outlet conduit 33 into a separator 34 constituting a recirculating cyclone, whose exhaust gas is supplied via the exhaust gas conduit 16 to the Venturi preheater 4 of the second preheating stage B. Part of the hot solids separated there are recirculated via the solids return conduit 15*a* into the annular fluidized bed 27 of the reactor 25. The other part of the hot solids first flows through the product supply conduit 15 into a mixing vessel 14 to which fluidizing gas is supplied through a supply conduit 35. It is provided to branch off part of the preheated, partly calcined solids through a solids conduit 13 coupled to the solids conduit 8 into the mixing vessel 14, in which the partly calcined solids from the solids conduit 13 are heated and calcined by the hot metal oxide from the product supply conduit 15. This mixture of product and partly calcined solids serves to adjust the quality of the product and to cool hot metal oxide.

The cooling of the product mixture generated in the mixing vessel 14 is effected in a downstream cooling system 40 to which belong four successive cooling stages D, E, F and G. The cooling stages D, E and F are three identical cooling cyclones 42 connected in series, to each of which belongs a pneumatic delivery conduit 41 in which the metal oxide with colder air each is conveyed upwards to the corresponding cooling cyclone 42. For this purpose, the hot metal oxide from the mixing vessel 14 is introduced through a solids conduit 45 into the pneumatic delivery conduit 41 of the first direct cooling stage D and charged into the cooling cyclone 42 of the first cooling stage D. From the lower end of the cooling cyclone 42, the metal oxide flows through the solids conduit 46 to the lower end of the pneumatic delivery conduit 41 of the second direct cooling stage E. The same is true for the third direct cooling stage F, from which the metal oxide is conveyed through the solids conduit 46 into the final cooler of the cooling stage G, which constitutes the fluidized-bed cooler 47.

The gas circulation in the direct cooling stages D, E and F is as follows: A blower 50 presses ambient air into the pneumatic delivery conduit 41 of the last direct cooling stage F up to the cooling cyclone 42. From the cooling cyclone 42 of each cooling stage F and E, this air each flows through an air conduit 51 to the base of the pneumatic delivery conduits 41 of the preceding cooling stages E and D and is then introduced as preheated combustion air via an air supply conduit 31 through the central tube 26 into the reactor 25.

The final cooler is designed as fluidized-bed cooler 47, through which extends a cooling coil 55 and which has vertical weirs 56, 57, at which the product to be cooled is retained and each forms a fluidized bed, the metal oxide to be cooled flowing over the weirs 56, 57 into the respectively next fluidized bed. Fluidizing air is introduced through an air supply conduit 59 into the respective stationary fluidized beds of the fluidized-bed cooler 47. Waste air heated in the fluidized-bed cooler 47 flows through a waste air conduit 60 into the pneumatic delivery conduit 41 of the cooling stage F. The cooled metal oxide leaves the final cooler 47 via the discharge conduit 63. Through the cooling coil 55, water usually flows as cooling medium.

The temperatures in the cooling cyclone 42 of the first cooling stage D typically lie in the range from 450 to 850° C., preferably between 500 and 720° C. In the cyclone 42 of the succeeding cooling stage E, the temperatures usually are 200 to 600° C. and are cooled to about 70° C., until the finished product is discharged.

Figure 3:
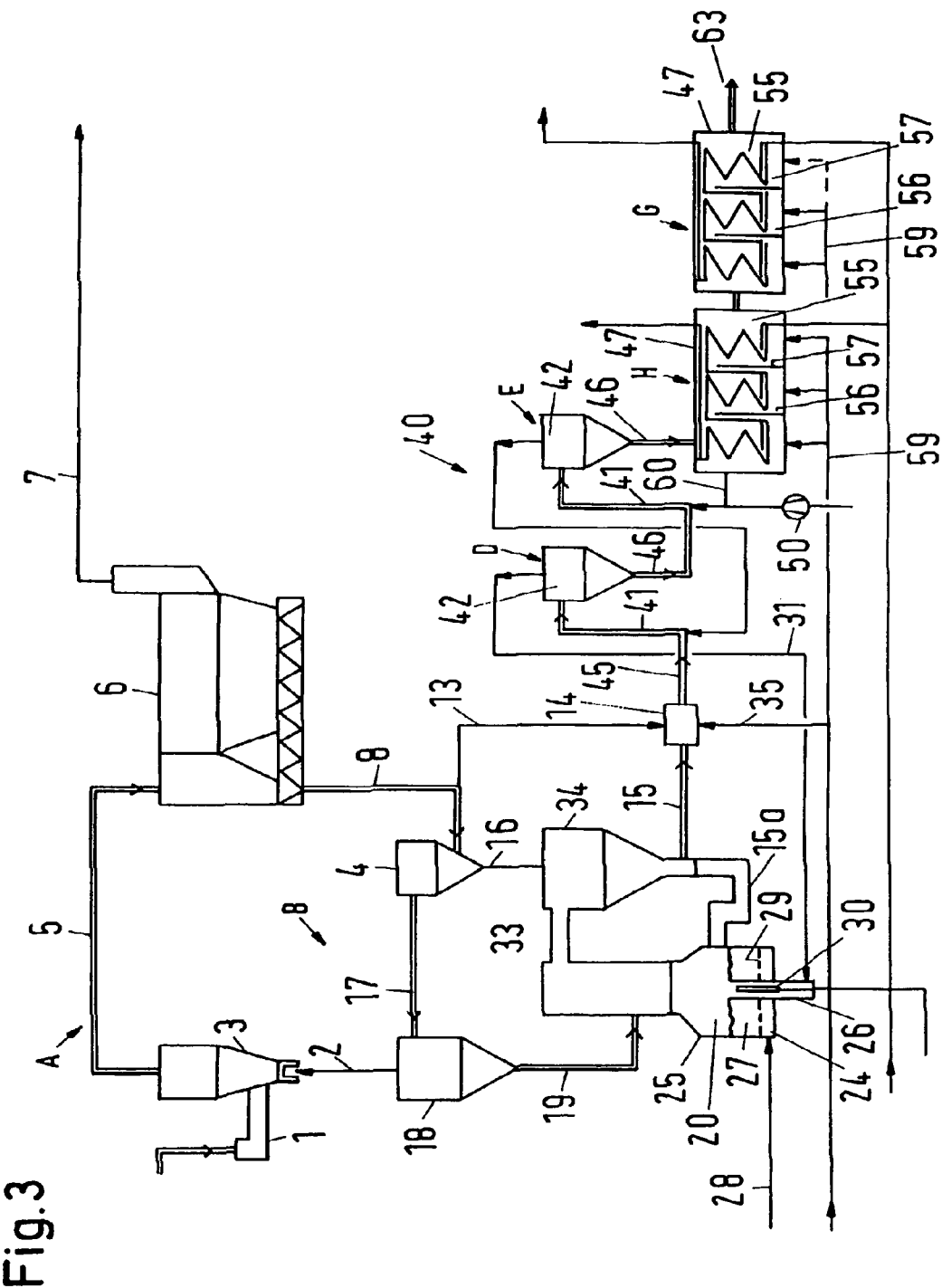
FIG. 3 shows a process diagram of a process and a plant in accordance with a second embodiment of the present invention.

The plant represented in FIG. 3 and the process related therewith substantially correspond to the system described in FIG. 1. A description of identical parts of the plant, which are also provided with the same reference numerals, will be omitted below.

The essential difference with respect to the above-described plant in accordance with FIG. 1 consists in the supply of fuel to the reactor 25. The reactor 25 is in turn designed such that in its lower region a stationary annular fluidized bed 27 is formed, above which extends a mixing chamber 20. From the lower region of the reactor 25 a central tube 26 extends through the stationary annular fluidized bed 27 up into the region of the mixing chamber 20. Through this central tube 26, combustion air preheated in the cooling system 40 is preferably introduced via the air supply conduit 31 directly into the mixing chamber 20 of the reactor 25, which typically has already been heated to temperatures between 450 and 850° C. In this variant, the fuel supply is also effected through the central tube 26, the fuel being supplied to the central tube 26 in the vicinity of the outlet opening in the upper orifice region of the central tube 26. It is thereby achieved that the combustion starts directly above the central tube 26 in the mixing chamber 20.

Figure 4:
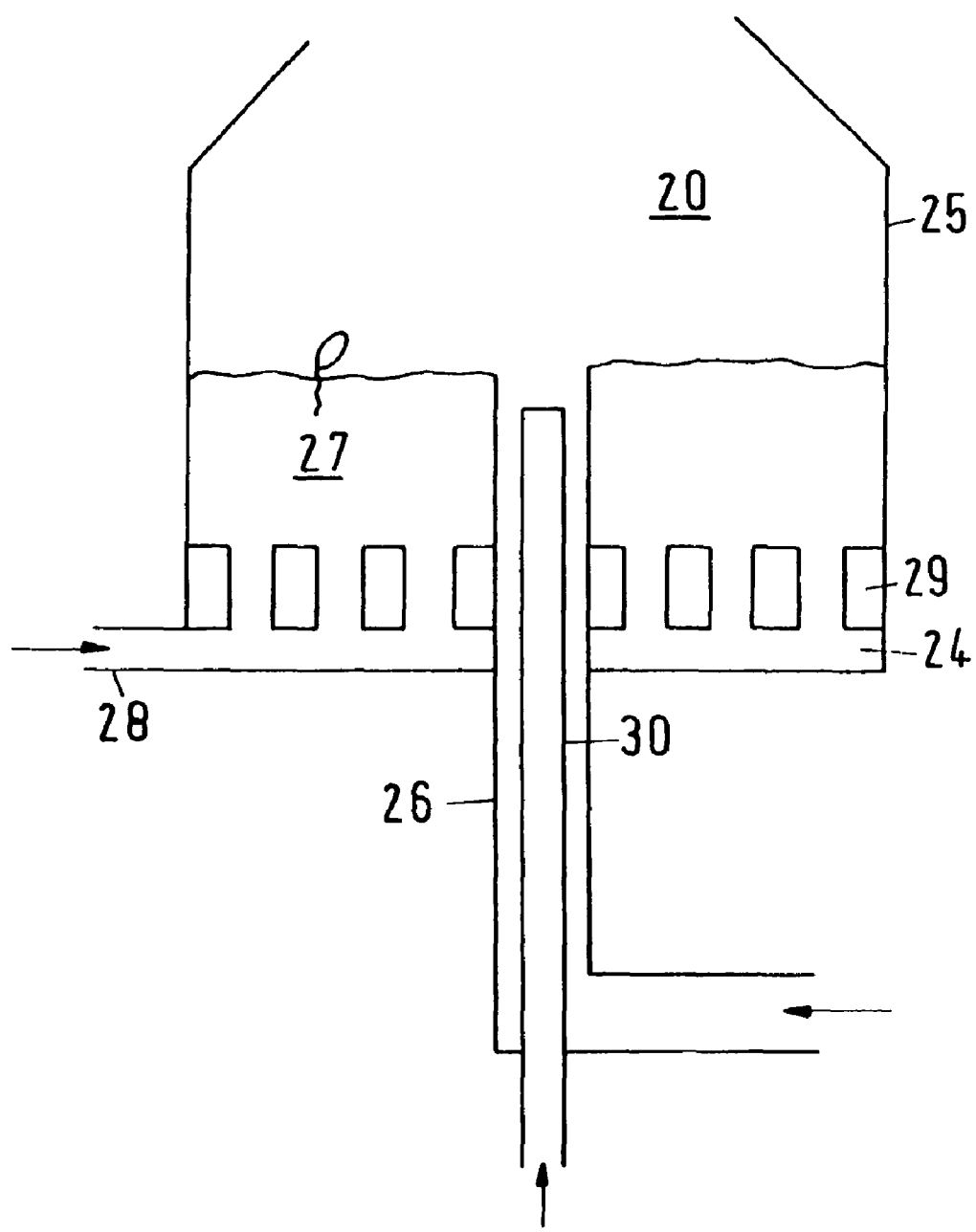
FIG. 4 shows a fluidized-bed reactor in accordance with the second embodiment.

As can be taken from FIG. 4, a lance 30 for supplying liquid or gaseous fuel is therefore arranged in the central tube 26. The fuel is entrained upwards into the mixing chamber 20 by the preheated air from the supply conduit 31 and mixes with the same. As a result, the combustion in the mixing chamber 20 starts directly above the central tube 26 open at the top and generates the desired calcining temperature. Through the supply conduit 28, the air required for fluidizing the annular fluidized bed 27 is supplied.

Furthermore, in the plant in accordance with FIG. 3 the cooling stage F with the cooling cyclone 42 is replaced by a cooling stage H with a fluidized-bed cooler 47, so that in accordance with FIG. 3 two cooling stages D, E with cooling cyclones 42 and two cooling stages G, H with fluidized-bed coolers 47 are provided.

A particular advantage of the process in accordance with the invention consists in that the advantages of a stationary annular fluidized bed 27 and a mixing chamber 20 (circulating fluidized bed) are utilized optimally, and at the same time the waste heat generated by cooling the product is again supplied to the reactor for saving energy. In addition, a controlled internal combustion is made possible.

Example 1

Production of Alumina

In the plant in accordance with FIG. 1, about 213,000 kg/h alumina with a temperature of 65° C. and 8.0 wt-% surface moisture are supplied via the screw conveyor 1. One part of the alumina pretreated in the first preheating stage A is introduced into the mixing chamber 14, and seven parts are introduced into the second preheating stage B. Behind the second preheating stage B, the solids in the solids conduit 19 have a temperature of 341° C. and are preheated to such an extent that about 70% of the hydrate water are removed. As fuel, 9750 Nm$^3$/h cold natural gas are introduced into the annular fluidized bed 27 of the fluidized-bed reactor 25 through the fuel conduit 21.

For this application, the Particle-Froude numbers $Fr_p$ in the stationary annular fluidized bed are about 0.17, in the mixing chamber about 2.96, and in the central tube about 9.9.

In the mixing vessel 14, the product discharged from the separator 34 is mixed with the precalcined solids from the first preheating stage A, whereby a product with a temperature of 618° C. is produced. From the hydrate supplied via the solids conduit 13, 9300 kg/h hydrate water are removed, so that the remaining mixture has an ignition loss of 0.9 wt-%.

In the discharge conduit 63, 129,000 kg/h alumina with a temperature of about 70° C. are obtained. The specific heat requirement of the total process is about 2750 kJ/kg product.

The subsequent Table indicates the temperatures T and the gas quantities G in various conduits of the plant in accordance with FIG. 1:

| | Conduit (ref. numeral) | | | |
|---|---|---|---|---|
| | 2 | 7 | 16 | 21 |
| G (Nm$^3$/h) | 201,000 | 223,000 | 151,000 | 9,750 |
| T (° C.) | 341 | 147 | 960 | 25 |

| | Conduit (ref. numeral) | | | |
|---|---|---|---|---|
| | 31 | 35 | 50 | 59 |
| G (Nm$^3$/h) | 120,000 | 700 | 82,400 | 16,000 |
| T (° C.) | 496 | 72 | 73 | 73 |

Example 2

Production of Alumina

In the plant in accordance with FIG. 3, about 102,000 kg/h aluminum hydroxide with a temperature of 65° C. and 7.0 wt-% surface moisture are supplied via the screw conveyor 1. One part of the aluminum hydroxide pretreated in the first preheating stage A is charged into the mixing chamber 14, and eight parts are charged into the second preheating stage B. Behind the second preheating stage B, the solids in the solids conduit 19 have a temperature of 343° C. and are preheated to such an extent that about 72% of the hydrate water are removed. As fuel, 5027 Nm$^3$/h cold natural gas are supplied to the fluidized-bed reactor 25 through the lance 30 into the central tube 26 and the mixing chamber 20.

For this application, the Particle-Froude numbers $Fr_p$ in the stationary annular fluidized bed are about 0.34, in the mixing chamber about 1.54, and in the central tube about 7.9.

In the mixing vessel 14, the product discharged from the separator 34 is mixed with the precalcined solids from the first preheating stage A, whereby a product with a temperature of 689° C. is produced. From the hydrate supplied via the solids conduit 13, 3970 kg/h hydrate water are removed, so that the remaining mixture has an ignition loss of 0.74 wt-%.

In the discharge conduit 63, 68,500 kg/h alumina with a temperature of about 70° C. are obtained. The specific heat requirement of the total process is about 2866 kJ/kg product.

The following Table indicates the temperatures T and the gas quantities G in various conduits of the plant in accordance with FIG. 1:

| | Conduit (ref. numeral) | | | | |
|---|---|---|---|---|---|
| | 2 | 7 | 16 | 30 | 28 |
| G (Nm$^3$/h) | 102,200 | 111,600 | 76,900 | 5,027 | 16,800 |
| T (° C.) | 343 | 156 | 1,000 | 25 | 274 |

| | Conduit (ref. numeral) | | | | |
|---|---|---|---|---|---|
| | 31 | 35 | 41 (E) | 59 (H) | 59 (G) |
| G (Nm$^3$/h) | 44,200 | 500 | 38,900 | 16,800 | 16,800 |
| T (° C.) | 573 | 70 | 392 | 70 | 70 |

Example 3

Preheating by Annular-Fluidized-Bed Heating Stages

Figure 5:
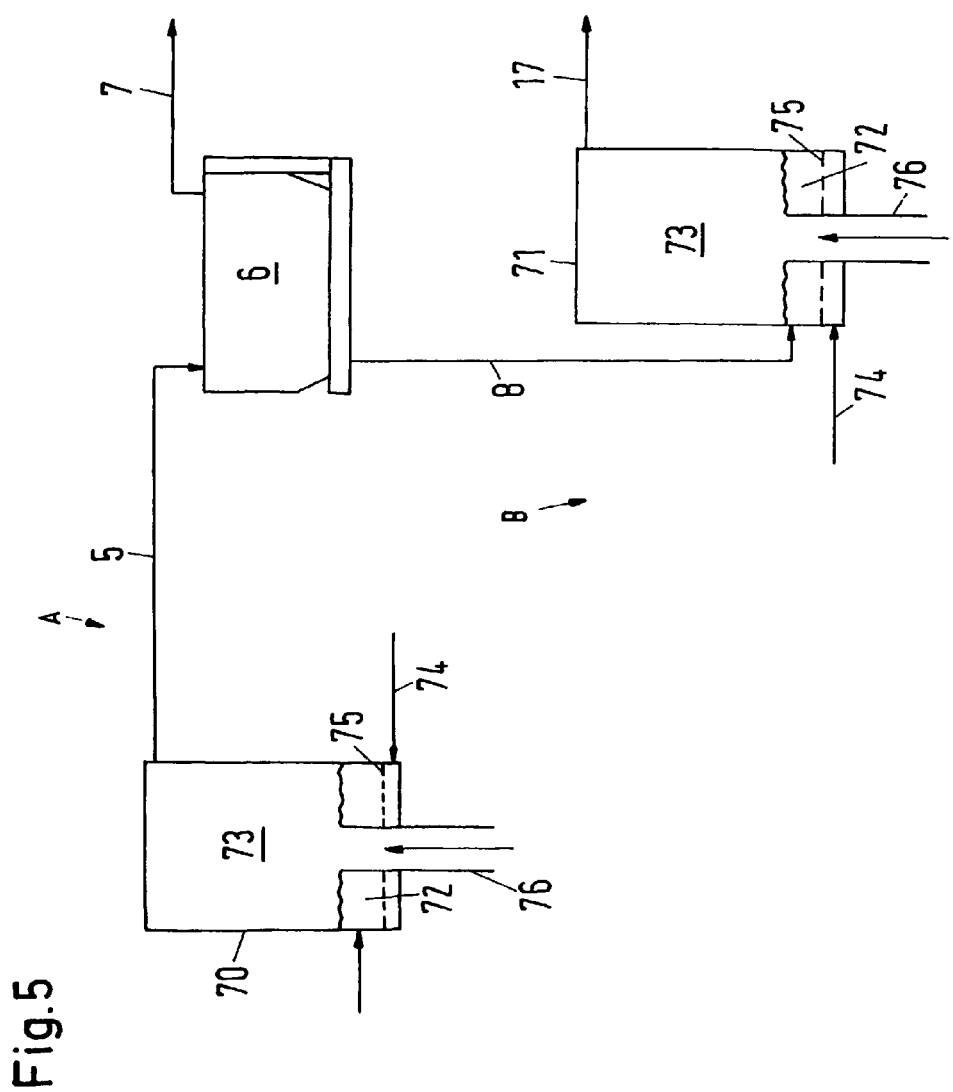
FIG. 5 shows a system in accordance with the invention comprising two preheating stages.

In accordance with FIG. 5, it is provided to replace the two Venturi preheaters 3, 4 of the first and second preheating stages A, B by annular-fluidized-bed heating stages 70,71 with a chamber for a stationary annular fluidized bed 72 and a mixing chamber 73, in order to achieve a particularly effective and gentle preheating. In the first step of preheating, the moist solids are dried at the surface and heated to a temperature of about 150° C. In the second preheating stage B, the solids then are precalcined, where about 70% of the hydrate water are removed and at the same time a further heating to about 350° C. occurs. In a first step, for instance 196 t/h moist aluminum hydrate with a temperature of 65° C. can be charged into the annular fluidized bed 72 of the annular-fluidized-bed heating stage 70 of the first preheating stage A and be fluidized with 5000 Nm$^3$/h air. The fluidizing air is introduced into the annular fluidized bed 72 via a feed conduit 74 and a gas distributor 75. Via a central tube 76, 197,000

Nm³/h flue gas with a temperature of about 340° C. are supplied. In the mixing chamber 73, the solids are dried, preheated to about 150° C., and 180 t/h of the solids are introduced as dry hydrate via the electrostatic precipitator 6 and a subsequent airlift into the annular fluidized bed 72 of the annular-fluidized-bed heating stage 71, where the hydrate is fluidized with 5000 Nm³/h air, which are supplied via a feed conduit 74. Via the central tube 76 of the annular-fluidized-bed heating stage 71, 150,000 Nm³/h flue gas with a temperature of about 1000° C. are introduced, whereby the dry hydrate is precalcined and is heated to about 350° C. From this second step, about 144 t/h precalcined material are discharged with the waste air.

LIST OF REFERENCE NUMERALS

| | |
|---|---|
| 1 | screw conveyor |
| 2 | exhaust gas conduit |
| 3 | Venturi preheater |
| 4 | Venturi preheater |
| 5 | solids conduit |
| 6 | separator, filter means |
| 7 | exhaust gas conduit |
| 8 | solids conduit |
| 13 | solids conduit |
| 14 | mixing vessel |
| 15 | product supply conduit |
| 15a | solids return conduit |
| 16 | exhaust gas conduit |
| 17 | solids conduit |
| 18 | separator, cyclone |
| 19 | solids conduit |
| 20 | mixing chamber |
| 21 | fuel conduit |
| 24 | gas distributor chamber |
| 25 | reactor |
| 26 | central tube |
| 27 | stationary annular fluidized bed |
| 28 | supply conduit |
| 29 | gas distributor |
| 30 | lance |
| 31 | air supply conduit |
| 33 | outlet conduit |
| 34 | separator |
| 35 | supply conduit |
| 40 | cooling system |
| 41 | delivery conduit |
| 42 | cooling cyclones |
| 45 | solids conduit |
| 46 | solids conduit |
| 47 | fluidized-bed cooler |
| 50 | blower |
| 51 | air conduit |
| 55 | cooling coil |
| 56 | weir |
| 57 | weir |
| 59 | air supply conduit |
| 60 | waste air conduit |
| 63 | discharge conduit |
| 70 | annular-fluidized-bed heating stage |
| 71 | annular-fluidized-bed heating stage |
| 72 | stationary annular fluidized bed |
| 73 | mixing chamber |
| 74 | feed conduit |
| 75 | gas distributor |
| 76 | central tube |
| A | first preheating stage |
| B | second preheating stage |
| D | cooling stage |
| E | cooling stage |
| F | cooling stage |
| G | cooling stage |
| H | cooling stage |

The invention claimed is:

1. A plant for producing metal oxide from metal compounds, the plant comprising:
a fluidized-bed reactor in which the metal compounds are heated by a combustion of a fuel to produce metal oxide, wherein the fluidized-bed-reactor reactor includes:
at least one gas supply tube at least partly surrounded by an annular chamber in which a stationary annular fluidized bed is disposed; and
a mixing chamber disposed above an orifice region of the gas supply tube, wherein a gas flowing through the gas supply tube entrains solids from the stationary annular fluidized bed when passing through the orifice region, and
a mixing vessel downstream of the fluidized-bed reactor, the mixing vessel being configured to mix a product with partly calcined metal oxide solids so as to obtain a product mixture.

2. The plant as recited in claim 1, wherein the gas supply tube extends substantially vertically upwards from a lower region of the fluidized-bed-reactor into the mixing chamber of the fluidized-bed-reactor.

3. The plant as recited in claim 1, wherein the gas supply tube is disposed approximately centrally, based on a cross-sectional area of the fluidized-bed-reactor.

4. The plant as recited in claim 1, further comprising a solids separator downstream of the fluidized-bed-reactor, wherein the solids separator includes a solids return conduit leading to the annular fluidized bed of the fluidized-bed-reactor and a solids conduit leading to a mixing vessel.

5. The plant as recited in claim 1, further comprising a gas distributor in the annular chamber of the fluidized-bed-reactor which divides the annular chamber into an upper annular fluidized bed and a lower gas distributor chamber, wherein the lower gas distributor chamber is connected with a fluidizing gas supply conduit.

6. The plant as recited in claim 1, wherein the fluidized-bed-reactor further comprises a gas supply tube conduit configured to supply at least one of a gas fuel and a liquid fuel to the gas supply tube.

7. The plant as recited in claim 1, wherein the fluidized-bed-reactor further comprises an annular chamber supply conduit configured to supply at least one of a gas fuel, a liquid fuel and a solid fuel to the annular chamber.

8. The plant as recited in claim 6, further comprising a lance disposed in the gas supply tube to extend into a region of the gas supply tube, the lance being configured to supply at least one of a gas fuel and a liquid fuel.

9. The plant as recited in claim 1, further comprising a preheating unit, the preheating unit comprising a chamber for a stationary annular fluidized bed and a mixing chamber.

10. The plant as recited in claim 9, wherein the preheating unit is upstream from the fluidized-bed-reactor.

11. The plant as recited in claim 1, wherein the mixing vessel is a fluidizing-gas-operated mixing vessel.

12. The plant as recited in claim 1, further comprising a cooling unit downstream of the fluidized-bed reactor for at least one of a product and a product mixture, the cooling unit comprising a fluidized-bed cooler with at least one vertical weir, at which at least one vertical weir the at least one of the product and the product mixture forms a fluidized bed.

13. A plant for producing metal oxide from metal compounds, the plant comprising:
a fluidized-bed reactor in which the metal compounds are heated by a combustion of a fuel to produce metal oxide, wherein the fluidized-bed-reactor reactor includes:

at least one gas supply tube at least partly surrounded by an annular chamber in which a stationary annular fluidized bed is disposed; and a mixing chamber disposed above an orifice region of the gas supply tube, wherein a gas flowing through the gas supply tube entrains solids from the stationary annular fluidized bed when passing through the orifice region, and a preheating unit disposed upstream of the fluidized-bed reactor configured to heat the solids and including a solids conduit leading to the annular fluidized bed of the fluidized-bed reactor.

14. The plant as recited in claim 13, wherein the preheating unit includes a first preheating stage including a first preheater and a second preheating stage including a second preheater.

15. The plant as recited in claim 14, wherein the first preheater and the second preheater each include a stationary annular fluidized bed and a mixing chamber.

16. The plant as recited in claim 14, wherein a separating cyclone is connected to the solids conduit and the second preheater, the separating cyclone including an exhaust gas conduit connected to the first preheater.

17. The plant as recited in claim 16, wherein the first preheater and the second preheater are Venturi preheaters.

18. A plant for producing metal oxide from metal compounds, the plant comprising:

a fluidized-bed reactor in which the metal compounds are heated by a combustion of a fuel to produce metal oxide, wherein the fluidized-bed-reactor reactor includes:

at least one gas supply tube at least partly surrounded by an annular chamber in which a stationary annular fluidized bed is disposed; and a mixing chamber disposed above an orifice region of the gas supply tube, wherein a gas flowing through the gas supply tube entrains solids from the stationary annular fluidized bed when passing through the orifice region, and a cooling unit disposed downstream of the fluidized-bed reactor for at least one of a product and a product mixture, the cooling unit comprising a fluidized-bed cooler with at least one vertical weir such that the at least one of the product and the product mixture forms a fluidized bed at the at least one vertical weir.

* * * * *